United States Patent [19]
Eichelberger

[11] 4,296,449
[45] Oct. 20, 1981

[54] RELAY SWITCHING APPARATUS

[75] Inventor: Charles W. Eichelberger, Schenectady, N.Y.

[73] Assignee: General Electric Company, Schenectady, N.Y.

[21] Appl. No.: 69,618

[22] Filed: Aug. 27, 1979

[51] Int. Cl.³ .............................................. H02H 3/033
[52] U.S. Cl. ............................................ 361/3; 361/8; 361/13
[58] Field of Search ............... 361/3, 8, 11, 13, 58; 307/134, 135

[56] References Cited

U.S. PATENT DOCUMENTS

| | | | |
|---|---|---|---|
| 2,958,808 | 11/1960 | Miller . | |
| 3,223,888 | 12/1965 | Koppelmann | 361/3 X |
| 3,237,030 | 2/1966 | Coburn . | |
| 3,249,810 | 5/1966 | Strom et al. | 361/11 X |
| 3,321,668 | 5/1967 | Baker . | |
| 3,328,606 | 6/1967 | Pinckaers . | |
| 3,330,992 | 7/1967 | Perrins . | |
| 3,339,110 | 8/1967 | Jones . | |
| 3,389,301 | 6/1968 | Siwko . | |
| 3,395,316 | 7/1968 | Denes et al. . | |
| 3,402,302 | 9/1968 | Coburn . | |
| 3,408,538 | 10/1968 | Gurwicz . | |
| 3,446,991 | 5/1969 | Howell . | |
| 3,466,503 | 9/1969 | Goldberg . | |
| 3,474,293 | 10/1969 | Siwko et al. . | |
| 3,504,233 | 3/1970 | Hurtle . | |
| 3,539,775 | 11/1970 | Casson . | |
| 3,543,047 | 11/1970 | Renfrew . | |
| 3,555,353 | 1/1971 | Casson . | |
| 3,558,910 | 1/1971 | Dale et al. . | |
| 3,588,605 | 6/1971 | Casson . | |
| 3,614,464 | 10/1971 | Chumakou . | |
| 3,633,069 | 1/1972 | Bernard . | |
| 3,639,808 | 12/1972 | Ritzow . | |
| 3,697,774 | 10/1972 | Pascente . | |
| 3,736,466 | 5/1973 | Fox et al. . | |
| 3,783,305 | 1/1974 | Lefferts . | |
| 3,809,959 | 5/1974 | Pucher . | |
| 3,868,549 | 2/1975 | Schaefer et al. . | |
| 3,874,743 | 4/1975 | Fleischer et al. | 303/92 |
| 3,982,137 | 9/1976 | Penrod . | |
| 4,001,643 | 1/1977 | Ramberg et al. | 361/8 |
| 4,025,820 | 5/1977 | Penrod . | |
| 4,074,333 | 2/1978 | Murakami et al. | 361/13 |
| 4,152,634 | 5/1979 | Penrod | 361/3 |

Primary Examiner—J. D. Miller
Assistant Examiner—Reinhard J. Eisenzopf
Attorney, Agent, or Firm—Geoffrey H. Krauss; James C. Davis; Marvin Snyder

[57] ABSTRACT

A switching circuit for selectively coupling a load to an A.C. power source is disclosed. The switching circuit includes a diode-commutated master relay contact and a pilot relay contact coupled in series therewith. The master and pilot relay contacts are coupled between a load and the power source in such a manner that power is applied to the load whenever both the master and pilot relay contacts are closed. A timing and control circuit performs a switching operation to open the master relay contact during a first half-cycle of the A.C. waveform of the power source during which the commutating diode is forward-biased. The pilot relay contact changes state during the next half-cycle of the A.C. waveform and the master relay contact is reclosed during the following half-cycle of the A.C. waveform.

17 Claims, 21 Drawing Figures

RELAY SWITCHING APPARATUS

BACKGROUND OF THE INVENTION

The present invention is directed towards improved relay switching apparatus and, more particularly, to relay switching apparatus which is used to provide a physical air gap between a power source and a load when power is removed from the load.

Relay switches of the foregoing type are especially important in connection with household appliances where it is often possible for the operator of the appliance to come into contact with the power lines coupling the power source to the load. One such application is the power switching of the Calrod ® elements for the surface unit of an electric range. In a typical unit, the user can turn the surface unit off and clean under the surface unit with a wet cloth. During such cleaning operations, it is possible to come into contact with the power leads supplying power to the surface unit. This constitutes a safety hazard unless a physical air-gap-disconnect is provided between the power lines feeding the surface unit and the power supply, when the unit is off.

In order to produce such an air gap, the prior art has provided a relay in series with the power line supplying power to the load. Whenever the surface unit is shut off, the relay is opened to provide a physical air gap between the power source and the power line feeding the surface unit. In order to prolong the life of the relay, typical prior art devices shunt the relay with a triac which is turned on by a timing and control circuit whenever the relay is to be opened or closed. As a result, the current which would normally flow through the relay is shunted by the triac and the relay is not subjected to both high currents and high voltages while it is switching states and therefore need not be capable of withstanding such power levels during the transition period. This makes possible the use of less expensive relays and lengthens the life of the relays. Once the relay has been opened or closed, the triac is disabled and power is either applied to, or cut off from, the load, depending upon the state of the relay.

While the foregoing apparatus has been found to be generally useful, it has two major drawbacks: (1) it requires a controlled gate supply to the triac which is of line voltage; and (2) triacs have a certain amount of leakage current in the off state, thereby enabling a certain amount of current to flow through the power leads even when the contact is open and the triac is off. As a result of the latter drawback, there is a chance that the user will receive a shock when contacting the power leads. For this reason, Underwriters Laboratories consider relay switching systems using triacs to be unsafe.

BRIEF SUMMARY OF THE INVENTION

In order to overcome the foregoing drawbacks, the present invention utilizes a pair of series-connected relays, one of which is shunted by a diode which serves to commutate the current flow through the shunted relay. As such, even when power is being applied to the load, substantial current will flow through the shunted relay (the master relay) only during that half-cycle of the A.C. input waveform during which the diode is back-biased. By opening or closing the master relay during the half-cycle in which the diode is forward-biased, the relay is not subject to substantial power levels during the transition period. This structure is substantially simpler than the prior art triac circuits since the diode automatically commutates current flow through the relay without requiring the timing and control circuitry required to enable and disable the triac.

As with the prior art triac circuits, some leakage current will pass through the shunting diode when it is back-biased and the master relay is open. However, the second relay (the pilot relay) serves as a positive break between the current source and the power lines since it is not shunted by a diode. The second relay is opened during the half-cycle of the input waveform in which the shunting diode is back-biased. During this half-cycle, substantially no current will flow through the second relay since the first relay has already been opened during the previous half-cycle and the diode is back-biased. As such, the voltage requirements of the second relay are very low and relatively inexpensive relays may be used.

In the preferred embodiment of the present invention, one shunted (or master) relay is coupled in series with a plurality of parallel-connected pilot relays. While the single master relay must be capable of withstanding some minimal voltage during its transition state (as is necessary with the prior art triac-shunted relays), each of the pilot relays is subjected to substantially no potential during its transition period and therefore has very low voltage requirements. This is extremely significant since it substantially reduces the cost of the relay switching system.

In summary, the relay switching apparatus of the present invention comprises:

(a) a master relay coupled in series with at least one pilot relay, with the master and pilot relays being adapted to be coupled between a power source and a load;

(b) a diode shunting the master relay; and (c) timing circuit means for controlling the timing and sequence of the opening and closing of the master and pilot relays such that, when the state of said pilot relay is to be changed, the master relay first opens during a half-cycle of the voltage supply during which the diode is forward-biased, the state of the pilot relay is changed during the following negative half-cycle of the supply voltage and the master relay is reclosed during the next positive half-cycle of the supply voltage waveform.

BRIEF DESCRIPTION OF THE DRAWINGS

For the purpose of illustrating the invention, there are shown in the drawings several embodiments which are presently preferred; it being understood, however, that this invention is not limited to the precise arrangements and instrumentalities shown.

DETAILED DESCRIPTION OF THE INVENTION

Figure 1:
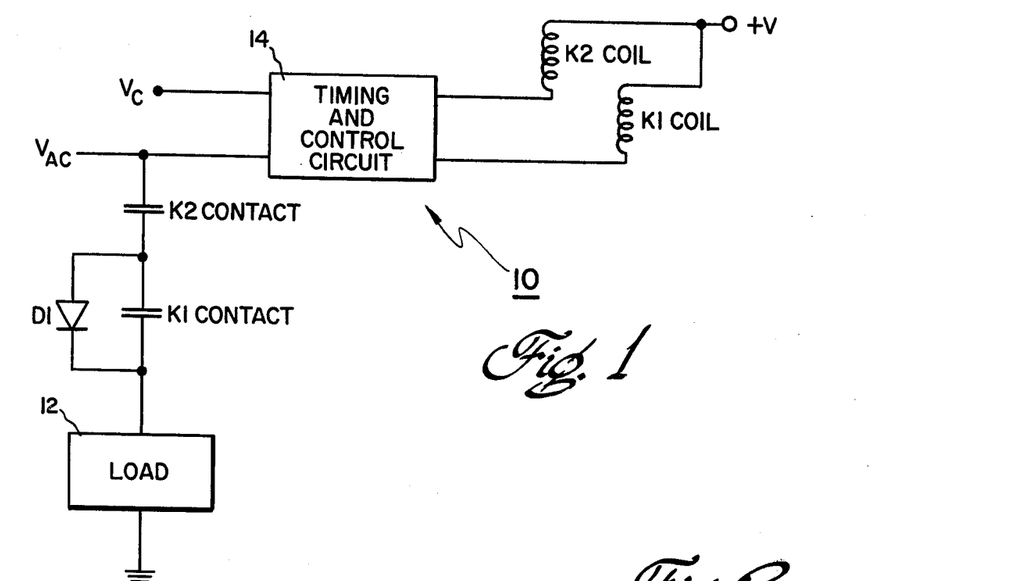
FIG. 1 is a block diagram of the relay switching circuit of the present invention.

Referring now to the drawings, wherein like numerals indicate like elements, there is shown in FIG. 1 a block diagram of a relay switching circuit constructed in accordance with the principles of the present invention and designated generally as 10. Switching circuit 10 includes a pair of relay contacts K1 and K2 coupled in series between a power source $V_{AC}$ and a load 12. The K1 contact is shunted by a commutating diode D1 which conducts during the positive half-cycle of the input A.C. waveform and is back-biased during the negative half-cycle thereof. Contact K1 is normally closed (see FIG. 2E) and is opened for one cycle whenever the state of the K2 contact is to be changed. The K2 contact is closed whenever power is to be applied to load 12 and is opened whenever power is to be removed from load 12. As such, the condition of contact K2 determines whether or not power is applied to load 12.

The condition of contact K2 is determined by a control signal $V_C$ which is applied to timing and control circuit 14. The signal $V_C$ may be generated by any appropriate manual or automatic means and indicates whether power is to be applied to load 12. By way of a simple example, the control signal $V_C$ may be generated by the manual control switch on an electric range which switch determines whether or not power is to be applied to a particular surface unit (the load 12). Whenever the switch is turned on, the control signal $V_C$ will assume a state (a binary "1" in the example shown) indicating that power is to be applied to load 12. Whenever the control switch is turned off, the control signal $V_C$ will assume a state (a binary "0" in the example shown) indicating that the power to be removed from load 12.

As noted above, the state of the pilot contact K2 is changed only when diode D1 is back-biased and contact K1 is opened. This is done to minimize the voltage requirements of contact K2. The state of contact K1 is changed only when diode D1 is forward-biased, for the same reason. To this end, timing and control circuit 14 controls the operation of the K1 and K2 contacts in such a manner that: (1) contact K1 is opened during a positive half-cycle of the input waveform $V_{AC}$ following a change in the state of the control signal $V_C$; (2) the state of contact K2 is changed during the next half-cycle of the input waveform (the negative half-cycle); and (3) contact K1 is again closed during the next succeeding positive half-cycle. As a result of this sequence of operations, the K1 contact is subject to only 0.7 volts (the forward-biased drop across diode D1) when it changes state while contact K2 is subject to substantially 0 volts when it changes state. After the transition period in which contacts K1 and K2 have opened and/or closed in accordance with the foregoing sequence of operations, the K1 contact remains closed and the K2 contact remains either opened or closed in accordance with the state of the control signal $V_C$. If the contact K2 is closed, current is applied directly from the voltage source $V_{AC}$ to the load 12 via closed contacts K1 and K2. When contact K2 is opened, load 12 will receive no power due to the positive air gap created by contact K2. When the state of the control input $V_C$ again changes, contacts K1 and K2 will again sequence between their open and/or closed positions as described above until contact K1 is again closed and contact K2 assumes the new condition dictated by the state of control signal $V_C$.

Figure 2:
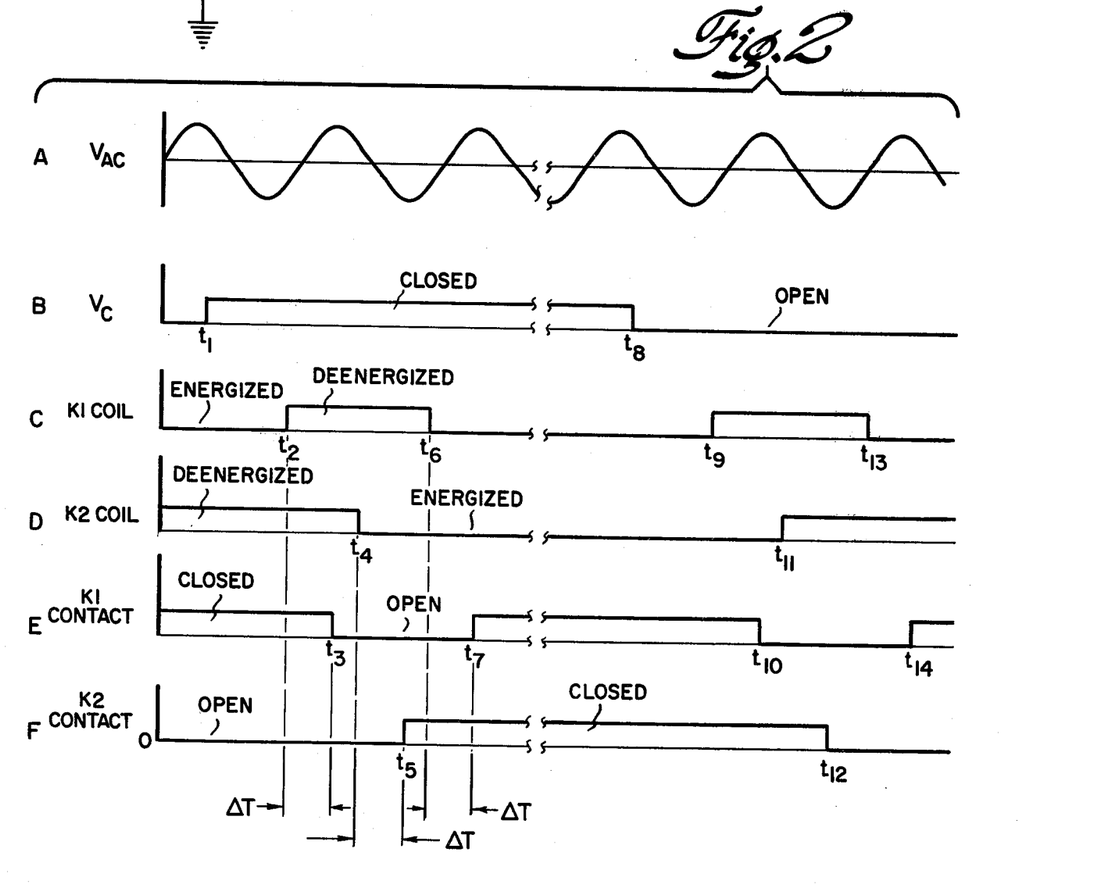
FIGS. 2A-2F are interrelated timing diagrams for the relay switching circuit of FIG. 1.

The manner in which timing and control circuit 14 controls the operation of contacts K1 and K2 may better be understood with reference to FIG. 2. Prior to time t1 (See FIG. 2B); it is assumed that switching circuit 10 is in the steady state, e.g. that contact K1 is closed and that contact K2 is open such that no power is applied to load 12. At time t1, the state of control signal $V_C$ changes to the binary "1" level indicating that power is to be applied to load 12. Responsive to this signal, timing and control circuit 14 monitors the timing of input waveform $V_{AC}$ and causes contacts K1 and K2 to change state during successive half-cycles of the input waveform. Since there is a finite delay time $\Delta T$ (typically 6 milliseconds) between the instant the coils K1 and K2 are either energized or deenergized and the instant that their corresponding contacts K1, K2 close or open, timing and control circuit 14 must energize and/or deenergize coils K1 and K2 $\Delta T$ seconds before the instant in which contacts K1 and K2, respectively, are to change state.

As shown in FIG. 2E, contact k1 is to open at time t3 which preferably corresponds to the peak of the positive half-cycle of the input waveform $V_{AC}$ following the instant t1 at which the control signal $V_C$ changed states. Contact K2 is to close at time t5 which corresponds to the peak of the negative half-cycle of the input waveform $V_{AC}$ following time t3. Finally, contact K1 is to reclose at time t7 corresponding to the peak of the positive half-cycle of the input waveform $V_{AC}$ following time t5. At this point, switching circuit 10 will be in its steady state condition and contacts K1 and K2 will both be closed thereby applying power to load 12.

In order to ensure the foregoing timing, timing and control circuit 14 must deenergize and energize coil K1 $\Delta T$ seconds before times t3 and t7, respectively. Additionally, circuit 14 must energize coil K2 $\Delta T$ seconds before time t5. To this end, timing and control circuit 14 deenergizes coil K1 at time t2 and deenergizes coil K1 at time t6. Times t2 and t6 precede times t3 and t7, respectively, by $\Delta T$ seconds. Coil K2 is energized at time t4 which also precedes time t5 by $\Delta T$ seconds. In this manner, timing and control circuit 14 ensures that the K1 contact sequentially opens and closes at time t3 and t7, respectively, and that the K2 contact closes at time t5.

After time t7, switching circuit 10 is in the steady state and contacts K1 and K2 are both closed. Contacts K1 and K2 remain in this position until the control signal $V_C$ changes to a state indicating that power is to be removed from load 12. As shown in FIG. 2B, this occurs at time t8. At time t9, timing and control circuit 14 deenergizes coil K1, causing contact K1 to open at time t10, while diode D1 is forward-biased and conducting. Timing and control circuit 14 also causes coil K2 to be deenergized at time t11, with the result that contact K2 is opened at time t12. At this instant no current flows through contact K2 since diode D1 is reverse-biased and contact K1 is open. Finally, at time t13, timing and control circuit 14 reenergizes coil K1 causing contact K1 to reclose at time t14, returning delay switching circuit 10 to its steady state condition with contact K2 open and power removed from load 12. Switching circuit 10 remains in this condition until the state of the control signal $V_C$ is again changed.

As a result of the foregoing, switching circuit 10 assures that contact K1 is opened during the positive half-cycle of the supply waveform $V_{AC}$ during which diode D1 is forward-biased, contact K2 changes state during the negative half-cycle of the supply waveform $V_{AC}$ during which diode D1 is back-biased and contact K1 is open and contact K1 is reclosed during the next positive half-cycle of the supply waveform $V_{AC}$. As noted above, this is a highly advantageous procedure since it ensures that the voltage carrying capabilities of contacts K1 and K2 are minimal and provides a positive air gap between the power source $V_{AC}$ and the load 12 when power is removed from the load 12.

Figure 3:
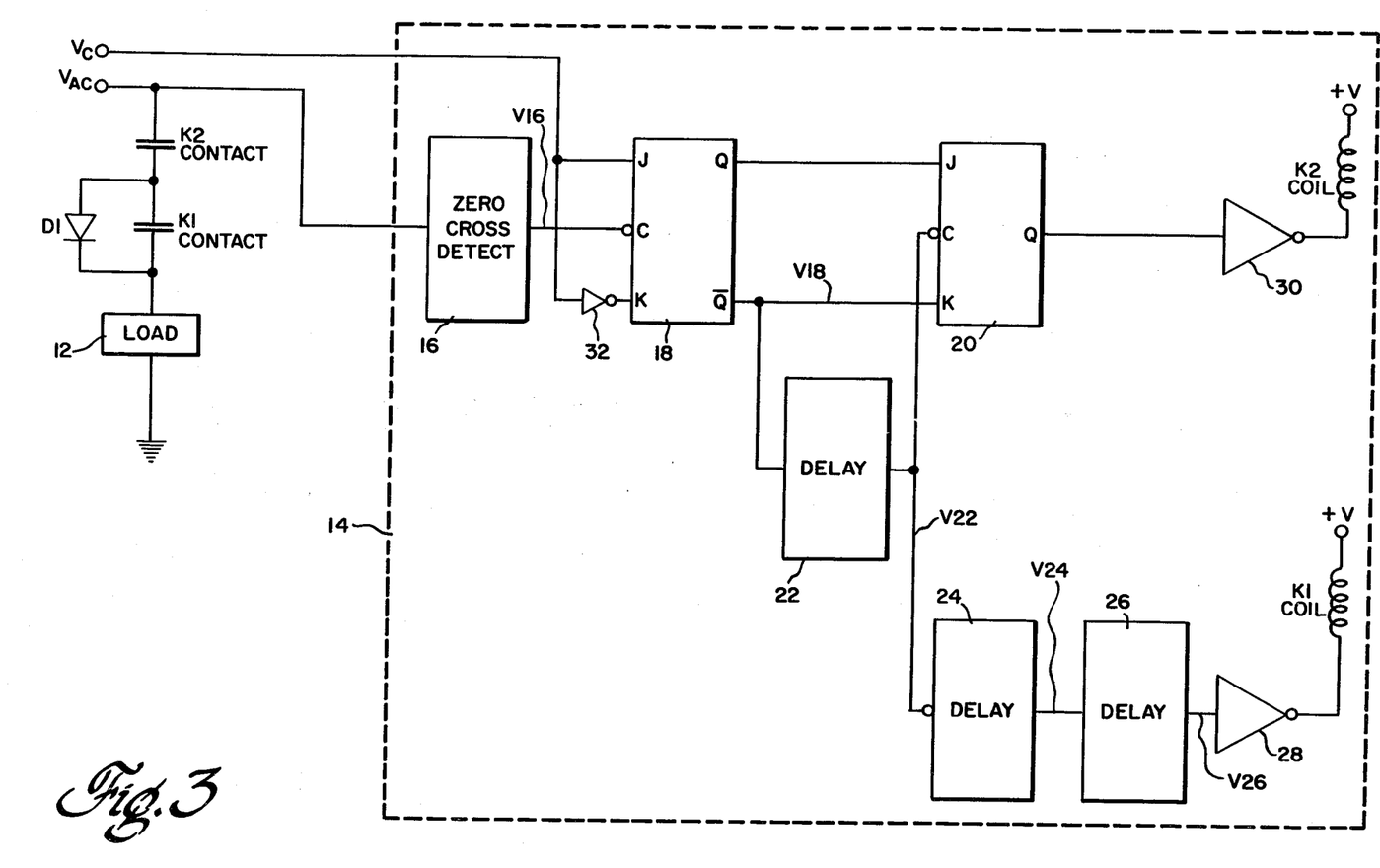
FIG. 3 is a block diagram of one embodiment of the timing and control circuit of FIG. 1.

One embodiment of timing and control circuit 14 is illustrated in FIG. 3. As shown therein, circuit 14 includes a zero-cross-detect circuit 16, a pair of JK flip-flops 18 and 20, a plurality of delay circuits 22, 24 and 26 and a pair of inverters 28 and 30. Zero-cross-detect circuit 16 monitors the power source waveform $V_{AC}$ and generates a negative-going output pulse each time the waveform crosses the zero volt level from the positive to the negative half-cycle. See FIGS. 4A and 4B. Zero-cross-detect circuit 16 does not generate an output pulse responsive to the zero crossing from the negative half-cycle to the positive half-cycle.

The output of zero-cross-detect circuit 16 is applied to the inverted clock input of flip-flop 18. As such, the information contained on the J and K inputs of flip-flop 18 are clocked into the Q and $\overline{Q}$ outputs thereof at each negative-going zero-crossover of the power source waveform $V_{AC}$. Since the J and K inputs of flip-flop 18 are coupled to the control signal $V_C$ (the latter input via an inverter 32), the outputs of flip-flop 18 will change at the first negative-going zero-crossover point following a change in the state of the control signal $V_C$ and will thereafter represent the desired state of the K2 contact.

The $\overline{Q}$ output of the flip-flop 18 is applied to the input of delay circuit 22. The output of delay circuit 22 pulses positive to the binary "1" level whenever its input pulses negative to the binary "0" level, and remains at the binary "1" level for a time period determined by an adjustable RC circuit internal to the delay circuit. In the embodiment illustrated, it is assumed that the output of delay circuit 22 remains at the binary "1" level for a time period $\Delta T1 = t5 - t2$. See FIG. 4E.

The output V22 of delay circuit 22 is applied to the inverted input of delay circuit 24 which is similar in structure and operation to delay circuit 22. As such, the output V24 of delay circuit 24 pulses positively to the binary "1" level whenever the output of delay circuit 22 pulses positively (e.g., at time t2). The output of delay circuit 24 remains at the binary "1" level for a time period $\Delta T2 = t3 - t2$ (see FIG. 4F) which determines the instant at which coil K1 is deenergized and therefore determines the instant at which contact K1 is opened. The output V24 of delay circuit 24 is applied to the input of delay circuit 26 whose output pulses positively to the binary "1" level when its input pulses negatively to the binary "0" level. The output of delay circuit 26 remains at the binary "1" level when its input pulses negatively to the binary "0" level. The output of delay circuit 26 remains at the binary "1" level for a delay period $\Delta T3 = t7 - t3$ (see FIG. 4G) and determines the length of time that contact K1 remains open. Since contact K1 is to remain open for one full cycle of the input waveform $V_{AC}$, $\Delta T3$ is preferably equal to the period of the waveform of the supply voltage $V_{AC}$.

The state of the output of delay circuit 26 determines the condition of contact K1. Particularly, when the output of delay circuit 26 is at the binary "1" level, the output of inverter 28 is at the binary "0" level and current will flow through coil K1, thereby closing contact K1. When the output of delay circuit 26 is at the binary "0" level, the output of inverter 28 is at the binary "1" level and the voltage across coil K1 will be insufficient to close the K1 contact. As such, the K1 contact remains open as long as the output of delay circuit 26 is at the binary "0" level.

The output V22 of delay circuit 22 is also applied to the inverted clock input terminal of flip-flop 20 and causes the information contained on the Q output of flip-flop 18 to be clocked into the Q output of flip-flop 20 whenever the output V22 pulses negatively to the binary "0" level (e.g., at time t5). The output of flip-flop 20 is applied to the input of inverter 30 and controls the state of coil K2. Particularly, when the output of flip-flop 20 is at the binary "1" level, the output of inverter 30 will be at the binary "0" level and current will flow through coil K2 causing contact K2 to close. Conversely, when the Q output of flip-flop 20 is at the binary "0" level, the output of inverter 30 will be at the binary "1" level and the voltage potential across coil K2 will be insufficient to close contact K2.

Figure 4:
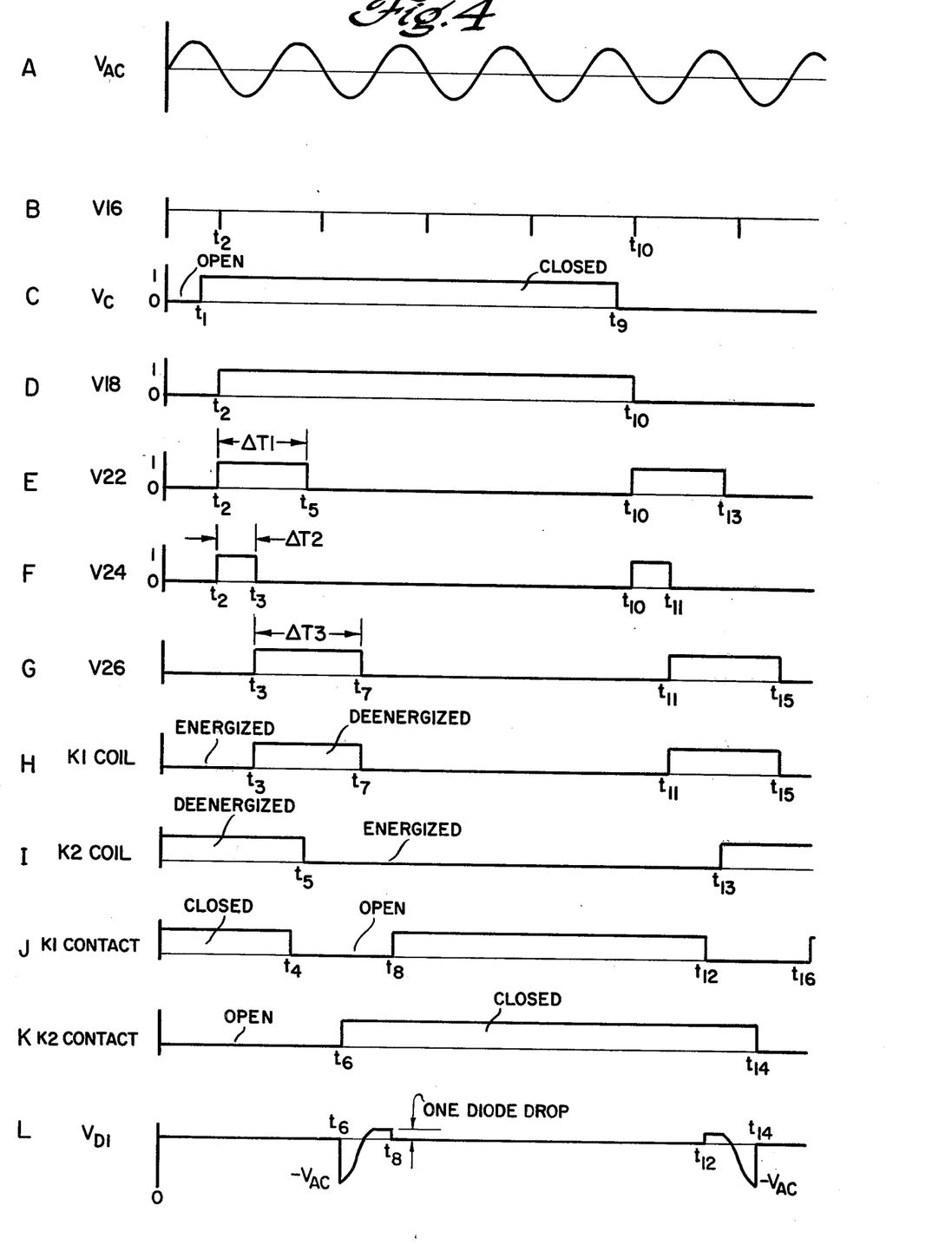
FIGS. 4A-4L are interrelated timing diagrams for the timing and control circuit of FIG. 3.

The operation of timing circuit 14 of FIG. 3 may best be understood with reference to the timing circuit of FIG. 4. As shown therein, the state of control signal $V_C$ changes from the binary "0" to the binary "1" level at time t1. At time t2, the input waveform $V_{AC}$ crosses from the positive to the negative half-cycle and the binary "1" state of the control signal $V_C$ (which state represents an indication that the contact K2 is to be closed and power is to be applied to load 12) is clocked into the Q output of flip-flop 18. Simultaneously, a binary "0" is clocked into the $\overline{Q}$ output of flip-flop 18 since the control signal $V_C$ is inverted by inverter 32 before it is applied to the K input of flip-flop 18.

The binary "0" on the $\overline{Q}$ output of flip-flop 18 is applied to delay circuit 22 and causes its output V22 to pulse to the binary "1" level at time t2. See FIG. 4E. Simultaneously, the output V24 of delay circuit 24 pulses to the binary "1" level since its input is inverted and receives the output V22 of delay circuit 22.

At time t3, the output V24 of delay circuit 24 pulses to the binary "0" level causing the output of delay circuit 26 to pulse to the binary "1" level. This causes the output of inverter 28 to pulse to the binary "0" level, thereby energizing coil K1. See FIGS. 4G, and 4H, respectively. After a time delay $T = t4 - t3$ representing the response time of relay K1, contact K1 opens. See FIG. 4J. Current does not flow through diode D1 at this time since contact K2 is still open. The delay time $\Delta T2$ of delay 24 is chosen to assure that contact K1 opens at approximately the peak of the positive waveform of the supply voltage $V_{AC}$ following the instant at which the state of the control signal $V_C$ changes.

At time t5, the output V22 of delay circuit 22 pulses negatively to the binary "0" level. This causes the binary "1" level of the Q output of flip-flop 18 to be clocked into the Q output of flip-flop 20. This signal is inverted by inverter 30, thereby energizing coil K2 at time t5 and causing contact K2 to close after a delay time $\Delta T$ determined by the response time of the relay K2. The time delay $\Delta T1$ of delay circuit 22 is selected to cause the Q output of flip-flop 18 to be clocked into the Q output of flip-flop 20 $\Delta T$ seconds before time t6 to ensure that the contact K2 is closed at an instant corresponding to the peak of the negative half-cycle of the input waveform $V_{AC}$, i.e. at time 66. Contact K2 remains in this position until the state of the control signal $V_C$ changes.

Finally, at time t7, the output of delay ciruit 26 pulses negatively to the binary "0" level, causing the output of inverter 28 to pulse to the binary "1" level and thereby deenergizing coil K1. After a time delay T determined by the response time of relay K1, contact K1 closes and remains closed until the state of control signal $V_C$ changes. The delay time $\Delta T3$ of delay circuit 26 is chosen to cause coil K1 to be reenergized at time t8 so as to assure that contact K1 closes at the peak value of the positive half-cycle waveform of the supply voltage $V_{AC}$. See FIG. 4J.

As a result of the foregoing sequence of operations, the voltage across diode D1 takes the form illustrated in FIG. 4L. As shown therein, the voltage across diode D1 reaches the peak value of the supply voltage $V_{AC}$ when the diode is back-biased and reaches one diode drop (approximately 0.7 volts) when the diode is forward-biased. Since diode D1 is required to sustain load current for approximately one-half of a cycle, the diode may be rated for surge current capability relative to the load current as opposed to average current capability. Accordingly, diode D1 can be ten times smaller than would be indicated by the average load current.

Figure 5:
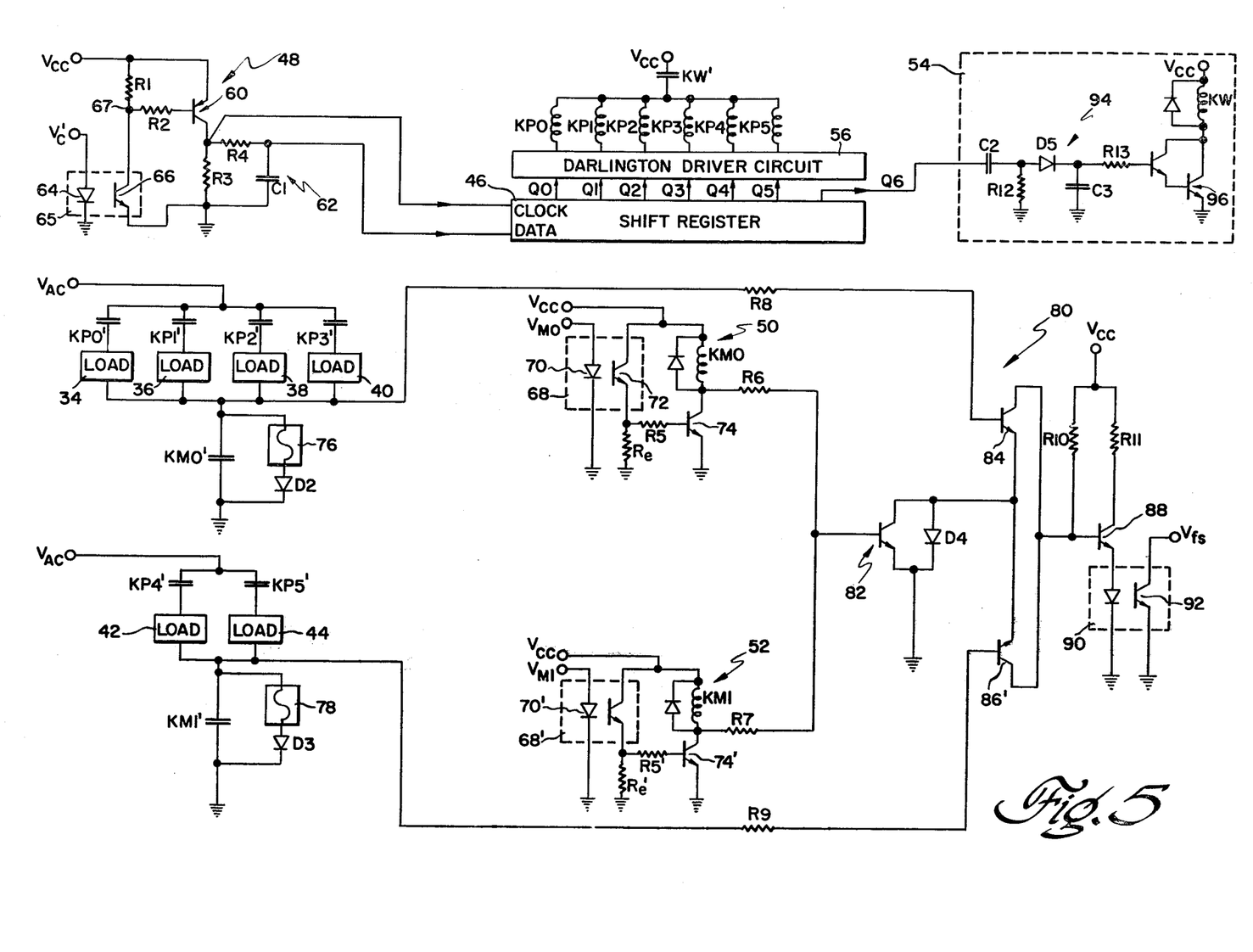
FIG. 5 is a circuit diagram illustrating one possible application of the relay switching circuit of the present invention.

In each of the foregoing embodiments, one load 12 and one pilot contact K2 are associated with the master contact K1. It is preferred, however, to couple a plurality of pilot contacts K2 and a plurality of loads 12 to each master contact K1. In such a system, the master contact K1 is caused to sequentially open and close in the manner described above whenever the condition of any one of the pilot contacts K2 is to be changed. This is advantageous since only one master relay is required to control the operation of a plurality of loads and pilot contacts. One practical application of the present invention wherein a plurality of loads and pilot contacts are associated with each master contact is illustrated in FIG. 5.

As shown therein, a first plurality of loads 34, 36, 38 and 40 are associated with a first master contact KM0' and a second plurality of loads 42 and 44 are associated with a second master contact KM1'. By way of example, the loads 34, 36, 38 and 40 may represent the individual surface units of a household range while the loads 42 and 44 may represent the ovens thereof. In FIG. 5, each of the master relays includes a master coil KMn and a master contact KMn', where n=0, 1. Each of the pilot relays includes a pilot relay coil KPm and a corresponding pilot relay contact KPm', where m=0, 1, ..., 5.

Each of the surface unit loads 34, 36, 38 and 40 is associated with a respective pilot relay contact KP0'-KP3' which is coupled between its respective load and an A.C. supply voltage $V_{AC}$. The state of each pilot relay contact KP0'-KP3' determines whether or not power is applied to its respective load 34-40. In a similar manner, each of the oven loads 42 and 44 is associated with a respective pilot relay contact KP4' and KP5' which is coupled between its associated load and the A.C. supply voltage $V_{AC}$. The state of each pilot relay contact KP4' and KP5' determines whether or not power is applied to its respective load 42 or 44.

Whenever power is to be applied to, or removed from, one of the loads 34, 36, 38 or 40, the master relay contact KM0' opens during a first positive half-cycle of the power supply waveform $V_{AC}$. The pilot relay KP0'-KP3' associated with the load 34-40 to which power is to be added or removed is opened or closed, as required, during the following negative half-cycle of the input waveform $V_{AC}$ and the master relay contact KM0' is re-closed during the next positive half-cycle of the input waveform $V_{AC}$. A similar procedure is followed when power is to be applied to or removed from the oven loads 42 and 44.

In one preferred embodiment of the invention, the timing and control circuit 14 comprises a microprocessor (not shown), isolating input circuits 48, 50 and 52 and shift register 46. The appropriate timing is determined by the microprocessor which monitors both the supply voltage waveform $V_{AC}$ and a plurality of control signals which indicate the desired state of the pilot contact KP0'-KP5' and cause the desired loads 34-44 to be switched in and out in accordance with the above-described switching sequence.

The microprocessor controls the operation of circuits 48, 50 and 52 by generating three output signals; a pilot relay control signal $V_C'$ and a pair of master relay control signals $V_{M0}$ and $V_{M1}$. Pilot relay control signal $V_C'$ takes the form of a pulse train whose individual bits indicate which of the loads 34-44 are to receive power at any given instant. In the example shown, each pulse train includes seven bits which are serially shifted into shift register 46 via isolating input circuit 48 and appear at the Q0-Q6 outputs thereof. The six pulses associated with outputs Q0-Q5 of shift register 46 each indicate whether or not power is to be applied to an associated load 34-44, respectively. Particularly, the information bit which appears at the output Q0 of shift register 46 determines whether or not power is to be applied to load 34, the information bit appearing at the Q1 output of shift register 46 determines whether power is to be applied to load 36, etc. The last information bit which appears at output Q6 of shift register 46 is applied to a watchdog circuit 54 whose operation is described below.

Each information bit contained in shift register 46 is in the form of either a binary "1" or a binary "0". These signals are applied to a Darlington driver circuit 56 which in turn is coupled to the pilot relay coils KP0-KP5. Darlington driver circuit 56 includes a plurality of Darlington transistors, each of which is coupled between a respective one of the outputs (e.g., Q0) of shift register 46 and a respective one of the pilot relay coils (e.g., KP0). Whenever the binary bit associated with a particular pilot relay coil is at the binary "1" level, the Darlington driver circuit 56 will ground the lower end of the associated pilot relay coil, permitting current to flow through that coil and energizing the same. As a result, after a time delay T (the response time of the relay), the pilot relay contact (e.g., KP0') associated with that relay will close. Conversely, when a given output (e.g., Q0) of shift register 46 is at the binary "1" level, the Darlington driver circuit 56 will place a voltage approximately equal to the biasing voltage Vcc on the lower end of the associated pilot relay contact (e.g., KP0), causing the pilot relay coil to deenergize. After a time delay $\Delta T$, the corresponding pilot relay contact (e.g., KP0') will open.

In the preferred embodiment, a new pulse train (containing seven bits of information) is applied to shift register 46 during each successive cycle of the power source waveform $V_{AC}$ (e.g., once every 60th of a second). The entire pulse train is preferably clocked into the shift register 46 in a fraction of the response time $\Delta T$ of the relays (e.g., in one millisecond) in order to assure that pilot relay coils KP0–KP5 (which have a typical response time of six milliseconds) do not react to the information bits as they are being clocked into the shift register. The state of the appropriate pilot contact coils KP0–KP5 will change (i.e., will be energized or deenergized) ΔT seconds after the entire pulse train has been clocked into the shift register, and the associated pilot relay contacts KP0′–KP5′ will be either opened or closed. Since the pilot relay contacts preferably open or close at approximately the midpoint of the negative half-cycle of the supply voltage $V_{AC}$ following the positive half-cycle during which the appropriate master relay contact KM0′ or KM1′ was opened, the microprocessor completes the transfer of an entire pulse train into shift register 46 at a time ΔT seconds before this instant.

As noted above, the control signal $V_C′$ is clocked into shift register 46 via isolating input circuit 48. Input circuit 48 serves two purposes; it optically isolates the microprocessor from the shift register 46 and it transforms pulse width modulated (PWM) signals generated by the microprocessor into amplitude modulated signals which may be accepted by the shift register. Each long pulse generated by the microprocessor represents a binary "0" while each short pulse represents a binary "1". During the time interval in between successive pulses, $V_C′$ is at the positive voltage level and LED 64 of Opto-Isolator 65 is enabled. This turns on transistor 66, grounding junction 67 between resistors R1 and R2 and turning transistor 60 on. With transistor 60 on, capacitor C1 charges to Vcc volts and maintains the data input of shift register 46 at the binary "1" level. Whenver a PWM pulse is generated by the microprocessor, LED 64 is disabled and transistor 66 is turned off. As a result, the biasing voltage Vcc is supplied to the base of transistor 60 via resistors R1 and R2 and causes tansistors 60 to turn off. During the entire length of the PWM pulse, capacitor C1 discharges through resistors R3 and R4 (which cooperate with capacitor C1 to form delay circuit 62). At the end of the PWM pulse, current again flows through LED 64, turning transistors 66 and 60 on. At this time, the collector of transistor 60 pulses positive to the Vcc level and cpacitor C1 is recharged via resistor R4.

The clock input of shift register 46 is enabled each time the input signal thereto pulses positive. Accordingly, shift register 46 will read in the information contained on capacitor C1 at the instant transistor 60 is turned on (i.e., at the trailing edge of the PWM pulse). If the pulse width of the PWM pulse is of relatively short duration, capacitor C1 will discharge only slightly and shift register 46 will detect the binary "1" on its data input when the clock input pulses high. If the width of the PWM pulse is relatively long, capacitor C1 will discharge substantially and shift register 46 will read a binary "0" on its data input when its clock input pulses positive. In this manner, the PWM pulses generated by the microprocessor are converted to amplitude modulated pulses by isolator input circuit 48 and are stored in shift register 46 as amplitude modulated pulses.

The master relay control signal $V_{M0}$ controls the operation of master relay contact KM0′. The master relay control signal $V_{M0}$ is normally at the binary "1" level and is applied to the LED 70 of Opto-Isolator 68 of isolating input circuit 50. As long as the master relay signal is at the binary "1" level, LED 70 is enabled, transistor 72 is on and base drive is applied to transistor 74 via resistor R5. The base drive applied to transistor 74 turns transistor 74 on and permits current to flow through the master relay coil KM0, thereby closing master relay contact KM0′. When the microprocessor receives a control signal indicating that power is to be applied to, or removed from, one of the loads 34–40, it pulses the master relay control signal $V_{M0}$ to the binary "0" level, thereby disabling LED 70 and turning off transistor 72. This removes base drive from transistor 74 and disables master relay coil KM0. To compensate for the response time of the relay, the microprocessor pulses the master relay control signal $V_{M0}$ to the binary "0" level approximately ΔT seconds before the midpoint of the positive half-cycle of the input waveform $V_{AC}$ following an indication that power is to be applied to, or removed from, one of the loads 34, 36, 38 and 40 so as to assure that the master relay contact KM0′ will open at the appropriate time. The microprocessor pulses the control signal $V_{M0}$ to the binary "1" level approximately one cycle of the input waveform $V_{AC}$ later so as to enable LED 70, turn on transistors 72 and 74 and energize master contact relay KM0 approximately ΔT seconds before the midpoint of the next positive half cycle of the input waveform. As such, master relay contact KM0′ closes at approximately the midpoint of the next positive half-cycle of the input waveform $V_{AC}$.

The operation of master relay coil KM1, and therefore the master relay contact KM1′, is controlled in a similar manner by the generation of the master relay control signal $V_{M1}$ whenever power is to be applied to or removed from one of the loads 42, 44. Since the structure and operation of input circuit 52 is substantially identical to that of input circuit 50, a description thereof will not be provided.

Summarizing the foregoing, whenever the microprocessor receives a control signal indicating that power is to be applied to or removed from one of the loads 34–44, it will first open the appropriate master relay contact KM0′ or KM1′ by causing the appropriate master relay control signal $V_{M0}$ or $V_{M1}$ to pulse to the binary "0" level during a first positive half-cycle of the input waveform $V_{AC}$, it then will enter the appropriate digital information into shift register 46 during the following negative half-cycle of the input waveform and will return the appropriate master relay control signal $V_{M0}$, $V_{M1}$ to the binary "1" level during the following positive half-cycle of the input waveform.

If either of the commutating diodes D2 or D3 operates improperly, the life of the master relay contacts KM0′ or KM1′ will be significantly shortened. Additionally, if the master relay contact fails and stays closed, the number of open contacts in series with the loads will be reduced, increasing the possibility that one of the pilot relay contacts will fail. If both the master contact and a pilot contact fail in a shortened condition, power will be applied to the associated load when not desired. To prevent this possibility, the embodiment of FIG. 5 includes a pair of slow blow fuses 76 and 78 and a fail-safe circuit 80.

Slow blow fuses 76 and 78 are coupled in series with commutating diodes D2 and D3, respectively. Should, for any reason, one of the master relay contacts KM0′ or KM1′ not close for a long period of time while any of the pilot relays are closed, its associated slow blow fuse will open and power will be removed from the load.

Fail-safe circuit 80 includes input circuits 50 and 52, transistors 82, 84, 86 and 88, Opto-Isolator 90 and diode D4. Fail-safe circuit 80 performs two tests on the commutating circuitry: a first test to determine if the master relays are working and a second test to determine if commutating diodes D2 and D3 are intact. Each of these tests is performed during the latter half of the positive half-cycle of the input waveform $V_{AC}$ after the appropriate master contacts KM0' or KM1' are to have been opened, but before the state of the appropriate pilot relay contact has been changed. As will be described below, one of the tests involves the energization of both master relay coils KM0 and KM1 in order to turn transistor 82 on. This test is performed, however, in a very short period of time (on the order of 10 microseconds) which is subtantially less than the reaction time ΔT of the relays and therefore does not cause a change in the state of the contacts KM0' and KM1'. If, at the end of the testing cycle, it is determined that both master relay contacts KM0' and KM1' are closed (at least one such contact should be open during the switching operation) or that either of the commutating diodes D2 or D3 (or their associated fuses 76 or 78) is not intact, the microprocessor will abort the switching cycle and will not change the state of any of the pilot relay contacts KP0'–KP5'. The microprocessor can also generate an alarm which indicates that the system is working improperly and should be shut off and/or repaired.

As noted above, the first test performed by fail-safe circuit 80 determines if the master relay contacts KM0' and KM1' are operating properly. Since the fail-safe test is performed during the latter half of the positive half-cycle of the input waveform $V_{AC}$ after the microprocessor has instructed at least one of the input circuits 50 and 52 to turn off its associated transistor 74 and 74', and thereby disable at least one of the master relay coils KM0 and KM1, base drive will be applied to transistor 82 via either, or both, of resistors R6 and R7. As such, transistor 82 will be on and the emitter of transistors 84 and 86 will be grounded. If the master relays are operating properly, at least one of the two master relay contacts KM0' and KM1' will be open and its associated commutating diode D2 and D3 will be forward-biased. Assuming that master relay contact KM0' is open and master relay contact KM1' is closed, approximately 0.8 volts (the forward-biased voltage drop across diode D2 plus the drop across fuse 76) will be applied to the base of transistor 84 via resistor R8 and the base of transistor 86 will be coupled to ground via resistor R9 and the closed master relay contact KM1'. In this condition, transistors 84 and 86 will be on and off, respectively. Since transistor 84 is on, the base of transistor 88 is grounded via transistors 82 and 84 and transistor 88 is off. As such, no current will flow through the LED of Opto-Isolator 90 and the fail-safe output signal Vfs which is coupled to an appropriate microprocessor input will be free to float at the level of the microprocessor input. Such a signal indicates that at least one of the primary relay contacts KM0' and KM1' is open and therefore that the master relays are working properly.

If the master relays were not working properly, both of the master relay contacts KM0' and KM1' would be closed, the bases of both transistors 84 and 86 would be grounded and both transistors would be off. In this condition, the base of transistor 88 receives drive voltage via resistor R10, is turned on and causes current to flow through the LED of Opto-Isolator 90 via resistor R11. The current through the LED of Opto-Isolator 90 turns the LED on, which turns transistor 92 on. In this condition, the fail-safe output signal Vfs will be grounded, thereby indicating that both master relay contacts are closed and that the master relays are operating improperly. In such a case, the microcomputer will abort the switching process.

Once the first test is complete and indicates that at least one of the master relay contacts KM0' and KM1' is open, a second test is performed to determine if the commutating diode D2 and D3 associated with the open relay is functioning properly. During this test, transistor 82 is turned off. To this end, the microprocessor causes both of the master relay control signals $V_{M0}$ and $V_{M1}$ to assume the binary "1" level, thereby turning on transistors 74 and 74' of respective input circuits 50 and 52 and grounding the base of transistor 82. This turns transistor 82 off, causing the emitter of transistors 84 and 86 to be at approximately 0.7 volts (one forward-biased voltage drop across diode D4). Assuming that master relay contact KM0' is open and master relay contact KM1' is closed, the voltage applied to the base of transistor 84 is approximately 0.8 volts if diode D2 and fuse 76 are intact. If this is the case, both transistors 84 and 86 will be off and transistor 88 will be on, causing the fail-safe output signal Vfs to be grounded. Such a signal indicates that the commutating diode and fuse associated with the open master relay contact are working properly.

If either fuse 76 or diode D2 is opened, approximately $V_{AC}$ volts will be applied to the base of transistor 84. This voltage is sufficiently high to overcome the 0.7 volts appearing at the emitter of transistor 84 and transistor 84 will be turned on. In this condition, the base of transistor 88 will also be at approximately ground potential and the transistor will be off. As such, the fail-safe output signal Vfs will be free to float at the input voltage level of the microprocessor and will indicate that either the diode D2 or the fuse 76 is working improperly. If such a signal is received, the microprocessor will abort the switching process.

As noted above, the Q6 output of shift register 46 is applied to watchdog circuit 54. Watchdog circuit 54 monitors the state of the output Q6 of shift register 46 to make sure that an appropriate pilot relay control signal $V_C'$ has been received from the microprocessor. Watchdog circuit 54 controls relay KW, which controls the supply of power to the pilot relay coils KP0–KP5. As long as the pilot relay control signal $V_C'$ is properly received, watchdog circuit 54 will energize relay coil KW, closing relay contact KW', and permitting power to be applied to the pilot relay coils KP0–KP5. Whenever the pilot relay control signal $V_C'$ is not properly received by shift register 46, watchdog circuit 54 disables relay coil KW, opening relay contact KW' and disabling all of the pilot relay coils KP0–KP5. In such a condition, power will be removed from all of the loads 34–44.

When operating properly, the microprocessor causes the first bit of each pulse train of the pilot relay control signal $V_C'$ (which bit is placed on the output Q6 of shift register 46) to change between the binary "1" and "0" state every other cycle of the supply voltage waveform $V_{AC}$. Watchdog circuit 54 monitors output Q6 of shift register 46 to make sure that it changes state every other cycle of the input waveform. As long as the Q6 output of shift register 46 continues to switch between the binary "0" and "1" states at an appropriate rate, watchdog circuit 54 will energize coil KW and thereby close contact KW.

Watchdog circuit 54 comprises a voltage-doubler 94 and a Darlington transistor 96. Voltage doubler 94 includes an RC circuit comprising resistor R12 and capacitor C2, a half-wave-rectifying diode D5 and a storage capacitor C3. The filter circuit R12–C2 acts as a high pass filter which passes any waveform having a frequency at least equal to one-half the frequency of the supply voltage waveform $V_{AC}$. As such, as long as the state of the output Q6 of shift register 46 changes every other cycle of the supply voltage waveform $V_{AC}$, the resulting square-wave will be applied to diode D5. The square-wave is rectified by diode D5 and capacitor C3 is charged to a voltage approximately twice the level of the square-wave output of Q6. The stored voltage appearing across capacitor C3 is applied to the base of Darlington driver 96 via resistor R13, causing transistor 96 to turn on. In this condition, current flows through relay coil KW and relay contact KW' remains closed.

If the state of the Q6 output of shift register 46 does not vary at least every other cycle of the power supply waveform $V_{AC}$, the resultant square-wave will have a frequency below that of the high-pass-filter R12–C2 and no signal will be applied to diode D5. In this condition, capacitor C3 will begin discharging. After a predetermined period of time, capacitor C3 will discharge sufficiently to remove base drive from transistor 96 and relay coil KW will be disabled. This will cause relay contact KW' to open and thereby deenergize all of the loads 34–44.

The present invention may be embodied in other specific forms without departing from the spirit or essential attributes thereof and, accordingly, reference should be made to the appended claims, rather than to the foregoing specification as indicating the scope of the invention.

What is claimed is:

1. A switching circuit for selectively coupling a load to an A.C. power source, said switching circuit comprising:
   (a) a master relay including a master relay contact and a master relay coil;
   (b) a pilot relay including a pilot relay and a pilot relay coil, said master and pilot relay contacts being coupled in series with each other and being coupled between said load and said power source to cause said power source to be coupled to said load whenever both said master and pilot relay contacts are closed; and to cause said power source to be completely disconnected from said load whenever at least said pilot relay contact is open; said pilot relay contact being devoid of any additional conductive element thereacross;
   (c) a single commutating diode coupled in parallel only with said master relay contact; and
   (d) timing and control circuit means for performing a switching operation in which:
   (1) said master relay contact is opened during a first half-cycle of the A.C. waveform of said power source during which said single commutating diode is forward-biased;
   (2) the state of said pilot relay contact is changed during a second half-cycle of said A.C. waveform, said second half-cycle being that half-cycle of said A.C. waveform immediately following said first half-cycle, and during which said single commutating diode is reverse-biased.
   (3) said master relay contact is closed during a third half-cycle of said A.C. waveform, said third half-cycle being that half-cycle of said A.C. waveform immediately following said second half-cycle.

2. A switching circuit according to claim 1, wherein said timing and control circuit means further includes means for:
   (a) disabling a flow of current through said master relay coil at a time interval $\Delta T$ before said master relay contact is to be opened;
   (b) changing the state of current flow through said pilot relay coil at a time interval $\Delta T'$ before the state of said pilot relay contact is to be changed; and
   (c) enabling a flow of current through said master relay coil at a time interval $\Delta T$ before said master relay contact is to be reclosed; wherein the time interval $\Delta T$ is the response time of said master relay and the time interval $\Delta T'$ is the delay time of said pilot relay.

3. A switching circuit according to claim 1, wherein said timing and control circuit means includes means for closing said master relay contact at the middle of said first half-cycle of said A.C. waveform, for changing state of said pilot relay contact at the middle of said second half-cycle of said A.C. waveform, and for reclosing said master relay contact at the middle of said third half-cycle of said A.C. waveform.

4. A switching circuit according to claim 1, wherein said timing and control circuit means includes means for monitoring both said A.C. waveform and a control signal which indicates whether said power supply is to be coupled to, or removed from, said load; said timing and control means being adapted for initiating said switching operation responsive to a change in the state of said control signal.

5. The switching circuit of claim 4, wherein said timing and control circuit means includes a zero-cross-detect circuit receiving only the A.C. waveform from said source and used to determine the phase of said source A.C. waveform.

6. The switching circuit of claim 5, wherein said zero-cross-detect circuit outputs a signal for at least each source A.C. waveform zero crossing in a selected direction, and said timing and control circuit further includes a flip-flop which stores the state of said control signal and receives the zero-cross-detect circuit output to initiate said switching operation responsive to the next detect circuit output signal after said control signal changes state.

7. The switching circuit of claim 6, wherein said flip-flop has a data input and a clock input, said data input receiving said control signal, said clock input receiving said output signal from said zero-cross-detect circuit.

8. A switching circuit for selectively coupling any combination of a plurality N of loads, where N is an integer greater than 1, to an A.C. power source, said switching circuit comprising:
   (a) a master relay including a master relay contact and a master relay coil;
   (b) a plurality N of pilot relays, each of said pilot relays including a pilot relay contact and a pilot relay coil, each of said pilot relay contacts being coupled in series with a respective one of said N loads; said master relay contact being coupled in series with all of said pilot relay contacts to said power source insuch manner that each individual one of said N loads is connected to said power source only when both said master relay and the pilot relay contact associated with that individual one of said N loads are closed;

(c) a single commutating diode coupled in parallel only with said master relay contact; each of said pilot relay contacts being devoid of any additional conductive element thereacross;

(d) timing and control circuit means for performing a switching operation in which:

(1) said master relay contact is opened during a first half-cycle of the A.C. waveform of said power source during which said single commutating diode is forward-biased;

(2) the state of at least one of said pilot relay contacts is changed during a second half-cycle of said A.C. waveform, said second half-cycle being that half-cycle of said A.C. waveform immediately following said first half-cycle, during which second half-cycle said single commutating diode is reverse-biased; and (3) said master relay contact is closed during a third half-cycle of said A.C. waveform, said third half-cycle being that half-cycle of said A.C. waveform immediately following said second half-cycle.

9. A switching circuit according to claim 8, wherein said timing and control circuit means includes means for (a) disabling a flow of current through said master relay coil at a time interval $\Delta T$ before said master relay coil is to be opened;

(b) changing the state of current flowing through said pilot relay coils associated with said at least one pilot relay contact at a time interval $\Delta T'$ before the state of said at least one pilot relay contact is to be changed; and (c) enabling a flow of current through said master relay coil at a time interval $\Delta T$ before said master relay contact is to be reclosed; the time interval $\Delta T$ being the response time of said master relay and the time interval $\Delta T'$ being the delay time of each of said pilot relays.

10. A switching circuit according to claim 8, wherein said timing and control circuit means includes means for closing said master relay contact at the middle of said first half-cycle of said A.C. waveform, for changing state of said at least one pilot relay contact at the middle of said second half-cycle of said A.C. waveform; and for reclosing said master relay contact at the middle of said third half-cycle of said A.C. waveform.

11. A switching circuit according to claim 8, wherein said timing and control circuit means includes means for monitoring both said A.C. waveform and a plurality of control signals indicative of whether said power supply is to be coupled to or removed from respective ones of said loads; and means for initiating said switching operation responsive to a change in the state of at least one of said control signals and a next subsequent zero-crossing of said A.C. waveform thereafter.

12. The switching circuit of claim 8, further including a fuse coupled in series with said single commutating diode, said series-connected fuse and diode being connected in parallel with said master relay contact.

13. The switching circuit of claim 8, further including fail-safe circuit means for determining that either said commutating diode or said master relay contact is operating improperly and then for halting said switching operation.

14. The switching circuit of claim 13, wherein said fail-safe circuit means includes first means for determining whether said commutating diode and said master relay contact are operating properly during said first half-cycle of said A.C. waveform; and second means for halting said switching operation before said second half-cycle of said A.C. waveform whenever said first means provides an output indicative of either said commutating diode or said master relay contact operating improperly.

15. The switching circuit of claim 14, wherein said fail-safe circuit means first means includes first test means for determining if said master relay contact is operating properly; and second test means for determining if said commutating diode is operating properly.

16. The switching circuit of claim 8, further including means for storing a plurality of binary bits, each of said binary bits indicating whether power is to be coupled to or removed from a respective one of said loads.

17. The switching circuit of claim 16, wherein new information is read into said storage means at a predetermined frequency; and further including watchdog circuit means for removing power to all of said loads whenever it is determined that information is not properly being read into said storage means.

* * * * *